US005686802A

United States Patent [19]

Ikegami

[11] Patent Number: 5,686,802

[45] Date of Patent: Nov. 11, 1997

[54] METHOD AND APPARATUS FOR GENERATING COHERENT PARTICLE BEAM

[75] Inventor: Hidetsugu Ikegami, Takarazuka, Japan

[73] Assignee: Research Development Corporation of Japan, Japan

[21] Appl. No.: 568,562

[22] Filed: Dec. 7, 1995

[30] Foreign Application Priority Data

Dec. 28, 1994 [JP] Japan .................................... 6-326510

[51] Int. Cl.$^6$ ............................ H01J 25/00; H01J 23/08; H01S 1/00

[52] U.S. Cl. ......................... 315/500; 315/505; 315/5.29; 315/5.35; 313/11; 250/251

[58] Field of Search .................................... 315/503, 501, 315/505, 500, 5.29, 5.35; 313/11; 235/472

[56] References Cited

U.S. PATENT DOCUMENTS

| | | | |
|---|---|---|---|
| 4,940,893 | 7/1990 | Lo | 250/251 |
| 5,001,438 | 3/1991 | Miyata et al. | 313/11 |
| 5,138,271 | 8/1992 | Ikegami | 313/11 |
| 5,245,250 | 9/1993 | Ikegami | 315/5.29 |

FOREIGN PATENT DOCUMENTS

| | | |
|---|---|---|
| 426861 | 5/1991 | European Pat. Off. . |

*Primary Examiner*—Sandra L. O'Shea
*Assistant Examiner*—Joseph Williams
*Attorney, Agent, or Firm*—Lorusso & Loud

[57] ABSTRACT

Equipment for achieving uniformalization of energy and pulsing of a particle beam is installed in an accelerated charged particle-beam generator or particle-beam storage ring. For maximum efficiency, a CMC (cyclotron maser cooling) unit for achieving uniformalization of energy and pulsing of the particle beam is introduced to generate a coherent particle beam.

5 Claims, 2 Drawing Sheets

METHOD AND APPARATUS FOR GENERATING COHERENT PARTICLE BEAM

BACKGROUND OF THE INVENTION

This invention relates to a method and apparatus for generating a coherent particle beam, namely a particle beam having coherence at a uniform energy.

Conventional techniques for generating a coherent particle beam begin and end with the uniformalization of energy for the purpose of cooling the beam particles based upon the concept of Bose-Einstein condensation. As a consequence, the generation of a coherent particle beam lacks universality since it is limited to electron beams of ultra-high resolving power where the acceleration energy is on the order of 300 keV (kilo-electron volts).

SUMMARY OF THE INVENTION

An object of the present invention is to provide a method and apparatus for readily generating a coherent particle beam having a high time coherence by simultaneously implementing uniformalization of energy and pulsing with regard to any particle beam through a principle which is entirely different from that of the technique for generating a coherent electron beam by ultra-uniformalization of energy developed on the basis of the concept of spatial coherence of Bose-Einstein condensation according to the prior art.

According to the present invention, the foregoing object is attained by providing:

(A) A method of generating a coherent particle beam comprising the steps of introducing time coherence corresponding to spatial coherence of Bose-Einstein condensation, making use of pulsing in addition to uniformalization of energy possessed by the particle beam, and producing coherence in accelerated charged particles, which represents a generic term for charged electrons and ions. In other words, joint use is made of pulsing of the particle beam in order to mitigate the strict conditions of energy uniformalization in a method of generating a coherent charged particle beam.

(B) A method of generating a coherent particle beam comprising the steps of inducing cyclotron gyration in charged particles within a charged particle beam apparatus such as a particle microscope, an accelerator or a storage ring, applying a TE-mode high frequency electric field of frequency and strength matched to the magnetic field, and simultaneously inducing uniformalization of particle beam energy, namely CMC (cyclotron maser cooling) and gyration phase bunching, thereby generating a coherent charged particle beam.

(C) In the method of generating a coherent particle beam described in (A) or (B) above, a solenoid magnetic field for correction of gyration phase is introduced to make possible repetition of attainment of coherence within the charged particle beam apparatus.

(D) In a method of generating a coherent particle beam described in (A), (B) or (C) above, a particle-beam bending magnetic/electric field is introduced, a considerable portion of the particle beam energy is converted to gyration energy, and uniformalization and pulsing of the entire energy of the particle beam are performed simultaneously.

(E) An apparatus for generating a coherent particle beam, provided with a uniform solenoid magnetic field and a resonance cavity for generating a TE-mode high-frequency electric field having a frequency and strength matched to the solenoid magnetic field, wherein uniformalization of energy and pulsing possessed by the particle beam are performed simultaneously and a highly coherent particle beam is generated.

(F) An apparatus for generating a coherent particle beam, provided with a phase-correcting solenoid if necessary for assuring coherence of charged particles.

In general, a group of particles exhibits wave properties, namely the quantum effect, on a macroscopic scale at a temperature below a critical temperature $T_c$. Of the total number of particles, the following number of particles are rendered coherent:

$$[1-(T/T_c)^{3/2}]\times 100\% \tag{1}$$

In other words, these particles come to possess coherence. If these are Bose particles, this phenomenon is referred to as Bose-Einstein condensation. If the spin factor is disregarded, $T_c$ may be written as follows:

$$k\,T_c = p_{th}^2/2\,m_o \tag{2}$$

Average momentum $p_{th}$ of the thermal agitation is given by the following in accordance with Heisenberg's Uncertainty Principle:

$$p_{th}\cdot n^{-1/3} \fallingdotseq h \tag{3}$$

where K represents the Boltzmann constant, n represents the particle number density in a rest frame of the particles which moves in the direction of the solenoid magnetic axis, and h is Planck's constant. Generally, in the case of an accelerated particle beam, the particle number density is low and, for practical purposes, has an upper limit of $n=10^{16}$ ($m^{-3}$). As for the $T_c$ which satisfies both Equations (2) and (3), a very low temperature of less than $10^{-3}$ (K) is required even in the case of electrons. This is almost impossible for electron beams and is completely impossible for heavy-particle beams other than electron beams.

The conventional method described above is such that spatial coherence due to Bose-Einstein condensation is applied to a particle beam as is and the temperature of the particle beam is lowered to produce a coherent particle beam, However, if the method of this invention based upon time coherence is introduced, the severe conditions regarding the uniformity of particle beam energy for the purpose of lowering the temperature of the particle beam are relaxed. This paves the way for attainment not only of coherent electron beams but also of coherent heavy-particle beams.

A pulsed particle beam bunched in a length of time $t_p$ exhibits the quantum effect on a macroscopic scale, and the critical temperature $T_c$ for achieving a coherent particle beam is given by the following relation in accordance with Equation (3):

$$k\,T_c\cdot t_p \fallingdotseq h \tag{4}$$

In accordance with Equation (4), for a particle beam that is pulsed over a length of time of say, $t_p<10^{-12}$ (s), a group of particles within a pulse becomes a coherent particle beam having coherence at a fraction of $[1-(T/T_c)]\times 100\%$ at a temperature below $T_c=1$ (K). Conditions are mitigated by three figures (orders of magnitude) over the cooling temperature for condensation based upon Equations (2) and (3).

The simplest method of achieving coherence based upon time coherence of the present invention is to subject a pulsed particle beam to energy selection. With such a method, however, there is too much loss due to selection of valuable high-luminance particle beams. In principle, moveover, very short pulses and high resolution of energy are incompatible in terms of particle optical theory.

According to the invention, a coherent particle beam exhibiting time coherence is readily generated without loss of particles, as will be described below.

DESCRIPTION OF THE PREFERRED EMBODIMENT

An embodiment of the present invention will now be described with reference to the drawings.

Figure 1:
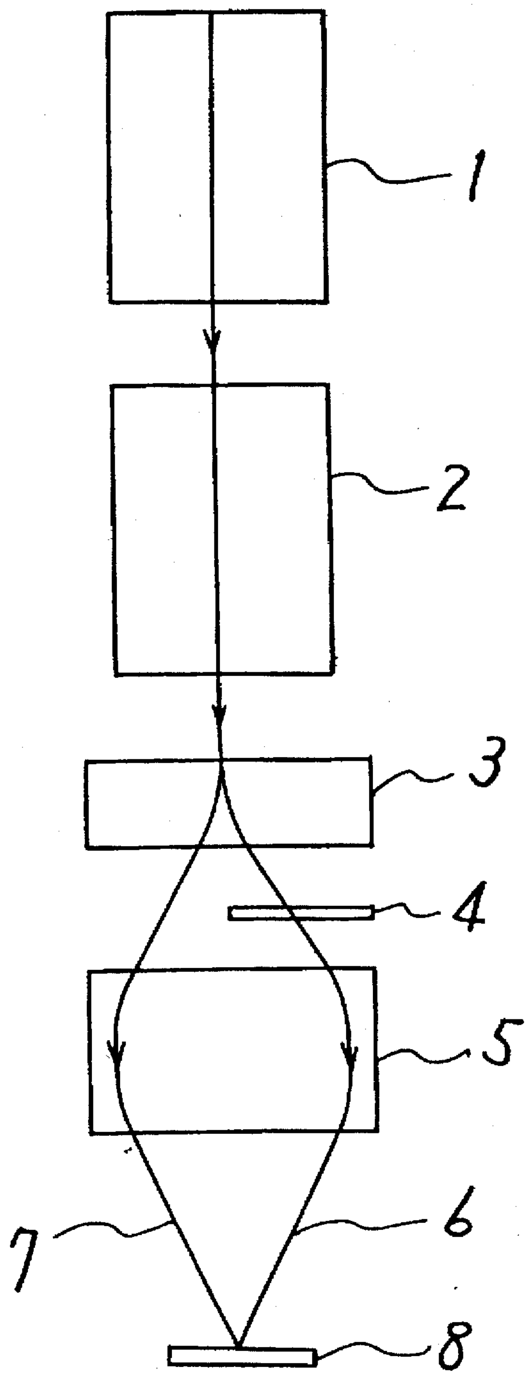
FIG. 1 is a schematic view showing a time-coherence electron-beam holographic apparatus according to an embodiment of the present invention.

As shown in FIG. 1, a time-coherence electron-beam holographic apparatus in which the present invention is applied to electron-beam holography includes an electron-source/accelerating lens system 1 used in an electron microscope, a CMC (cyclotron maser cooling) unit 2 in which an electron beam is made a coherent electron beam exhibiting time coherence, an electron-beam divergence element 3, a specimen 4, a focusing element 5, a signal electron beam 6 which passes through the specimen 4, a reference electron beam 7 and electron detector 8 for observing coherence.

Figure 2:
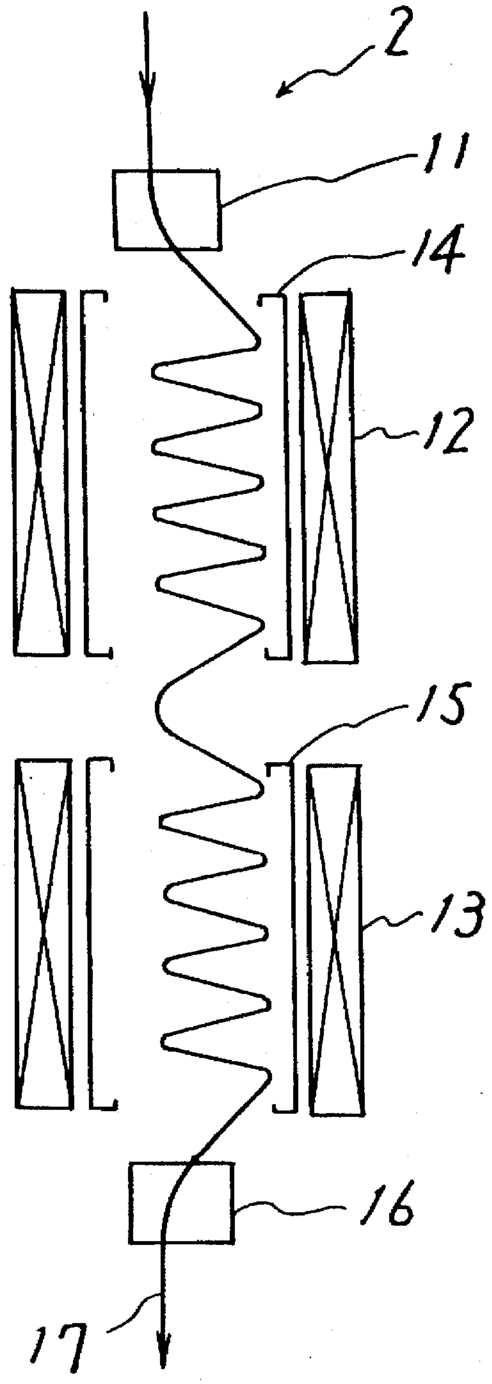
FIG. 2 is a schematic view showing a CMC unit installed in the time-coherence electron-beam holographic apparatus according to the embodiment of the present invention.

FIG. 2 illustrates the construction of the CMC unit 2 according to the embodiment illustrated in FIG. 1. It should be noted that an auxiliary solenoid in this drawing and a high-frequency resonance cavity therein are not necessarily required in a single-pass type device of the kind according to this embodiment.

Shown in FIG. 2 are one or a plurality of electron-beam deflection elements 11, a solenoid coil 12, an auxiliary solenoid coil 13, TE-mode high-frequency resonance cavities 14, 15 and one or a plurality of electron beam deflection elements 16. The deflection element 11 may be a magnet or a deflecting electrode plate. Here a considerable portion of the kinetic energy of the electron beam is converted to gyration energy in a solenoidal magnetic field having a magnetic flux density $B_o$. The gyration frequency at this time is $(\omega_c/\gamma\perp)$, and the cyclotron frequency $\omega_c$ and the relativistic energy factor $\gamma_\perp$ of gyration are expressed by Equations (5) and (6), respectively, below.

$$\omega_c=e_oB_o/m_o \tag{5}$$

$$\gamma_\perp=(1-\beta_\perp^2)^{-1/2} \tag{6}$$

where $e_o$ and $m_o$ represent the electric charge of the electrons and the rest mass, respectively, $\beta_\perp=v_\perp/c$ wherein $v_\perp$ represents velocity of gyration, c is the velocity of light and $\perp$ represents a transverse symbol.

The present invention is similar to the method of CMC (cyclotron maser cooling) in the "Method of Cooling Charged Particle Beam", described in the specification of Japanese Patent Application Laid-Open No. 2-223200 proposed by the present inventor. The resonance frequency $\omega_{rf}$ of the high frequency resonance cavity 14 is set to $$\omega_{rf}=\omega_c/\gamma_\perp \tag{7}$$

However, the amplitude $E_o$ of the high-frequency electric field $E_o$ is set to produce particle bunching as in equation:

$$E_o=\frac{\gamma_\perp^2\cdot m_oc}{\omega_c\tau_o^2e_o[2(1-\gamma_\perp^{-1})]^{1/2}} \tag{8}$$

When this is done, gyration phase bunching takes place at the same time that the gyration energy $\gamma_\perp\cdot m_oc^2$ of the particles is uniformalized, and the phase distribution width is narrowed from $2\pi$ to $\Delta_{\phi1}$. In Equation (8), $\tau_o$ represents residence time of the particles in the resonance cavity and is defined in a particle rest frame moving along the solenoid magnetic axis in the same manner as the bunching time duration $t_p$ and other physical quantities. In actual practice, the strength of the high-frequency magnetic field is tuned at the periphery of Equation (8). The bunching width $\Delta_{\phi1}$ of gyration phase is determined by $$\Delta_{\phi1}=\frac{\left(\frac{2\omega_c}{\gamma_\perp}\right)\tau_o}{1+a^2}\cdot\frac{2-\gamma_\perp}{\gamma_\perp}\cdot\frac{\Delta\gamma_\perp}{\gamma_\perp} \tag{9}$$

$$a=\frac{\left(\frac{2\omega_c}{\gamma_\perp}\right)\tau_o}{1-\gamma_\perp^{-1}} \tag{10}$$

Therefore, the pulse width $t_p$ of the particle beam that has undergone phase bunching in the resonance cavity is as follows:

$$t_p=\left(\frac{\gamma_\perp}{\omega_c}\right)\cdot\Delta_{\phi1}=\frac{2\tau_o}{1+a^2}\cdot\frac{2-\gamma_\perp}{\gamma_\perp}\cdot\frac{\Delta\gamma_\perp}{\gamma_\perp} \tag{11}$$

Here $\Delta\gamma_\perp$ represents fluctuation of $\gamma_\perp$.

In an example part of the electron-beam kinetic energy of $(\gamma-1)m_oc^2=150$ keV is converted to gyration energy of $(\gamma_\perp-1)m_oc^2=50$ keV by the CMC unit 2, resonance cavity length L=0.5 (m) and resonance frequency $\omega_{rf}=\omega_c/\gamma_\perp=2\times10^{10}$. Thus $\tau_o=3\times10^{-9}$ (s) and $a^2=120$, and $t_p=2\times10^{-11}(\Delta_{107\perp}/\gamma_\perp)$ is obtained. At an energy resolution of $\Delta\gamma_\perp/\gamma_\perp<10^{-4}$, $t_p$ is estimated to be less than $10^{-14}$ (s). Though the value of $t_p$ actually is somewhat larger owing to disturbance of the electromagnetic field, this is sufficiently smaller than the necessary length of time described in the actions of the invention discussed earlier. Furthermore, as described in detail in the specification of Japanese Patent Application Laid-Open No. 2-223200 proposed by the present inventor, the energy of the electron beam is uniformized to $\Delta\gamma_\perp/\gamma_\perp<10^{-4}$. As a result, we have T<1 (K) to obtain a coherent electron beam 17 exhibiting time coherence.

The auxiliary solenoid coil 13 may be introduced for correction of gyration phase. Alternately, in case of a circulation-type particle beam apparatus such as a particle storage ring, the symmetry of the overall apparatus may be improved by making the auxiliary solenoid coil 13 of the same type as that of the solenoid coil 12, reversing the auxiliary solenoid coil 13 solely in the direction of the magnetic field and incorporating the high-frequency resonance cavity 15 whose phase is made to match this.

As many apparently widely different embodiments of the present invention can be made without departing from the spirit and scope thereof, it is to be understood that the invention is not limited to the specific embodiments thereof except as defined in the appended claims.

In accordance with the present invention as described above in detail, the following effects can be obtained:

(1) In 1925, Albert Einstein pointed out theoretically the possibility of Bose-Einstein condensation. However, it is extremely difficult to bring about the spatial coherence such as Bose-Einstein condensation of particles in an accelerated particle beam having a density which is much lower than that of bulk particles of matter. Uniformalizing the energy of a pulsed particle beam in the manner of this invention paves the way for ready generation of a coherent particle beam exhibiting time coherence.

(2) CMC (cyclotron maser cooling) is utilized. This, in addition to inducing gyration in a particle beam, simultaneously pulses the particle beam by phase bunching and uniformalizes the energy of the particle beam. As a result, generation of a coherent particle beam exhibiting time coherence can be achieved at maximum efficiency.

(3) Generation of a coherent particle beam exhibiting time coherence for CMC utilization is possible in single-pass type devices such as electron microscopes and in circulation-type apparatus such as particle storage rings. A feature of the invention is that absolutely no limitation is placed upon the kind or the energy of the particle beam.

What is claimed is:

1. A method of generating a coherent particle beam comprising the steps of:

generating a particle beam;

passing the particle beam through a solenoid magnetic field having a magnetic axis parallel to the particle beam;

producing gyration of the particle beam within the solenoid magnetic field; and subjecting the gyrating particle beam in the solenoid magnetic field to an electric field having a frequency equal to a frequency of gyration of the particle beam within the solenoid magnetic field along the magnetic axis and having an amplitude so as to bunch particles in the particle beam and produce time coherence of the particle beam.

2. A method according to claim 1 wherein the amplitude $E_0$ of the electric field is set in the gyrating particle rest frame to the formula:

$$E_o = \frac{\gamma_\perp^2 \cdot m_o c}{\omega_c \tau_o^2 e_o [2(1-\gamma_\perp^{-1})]^{1/2}}$$

wherein $\gamma_\perp$ is a relativistic energy factor of gyration, $m_0$ is a particle rest mass, c is the velocity of light, $\omega_c$ is a cyclotron frequency, $\tau_0$ is a residence time of particles in the electric field, and $e_0$ is an electric charge of a particle.

3. A method according to claim 1 wherein the subjecting of the particle beam to an electric field also stimulates cyclotron maser cooling of the particle beam.

4. An apparatus for generating a coherent particle beam comprising:

means for generating a particle beam;

a magnetic solenoid for generating a solenoid magnetic field having a magnetic axis extending parallel to and along the particle beam;

a beam deflector for deflecting the particle beam at the at an entrance of the magnetic solenoid to produce gyration of the particle beam within the solenoid magnetic field;

a resonant cavity within the magnetic solenoid along the path of the gyrating particle beam; and means for producing in the resonant cavity an electric field having a frequency equal to a frequency of gyration of the particle beam within resonant cavity along the magnetic axis and having an amplitude so as to bunch particles in the particle beam and produce time coherence of the particle beam.

5. An apparatus according to claim 4 wherein the amplitude $E_0$ of the electric field is set in the gyrating particle rest frame to the formula:

$$E_o = \frac{\gamma_\perp^2 \cdot m_o c}{\omega_c \tau_o^2 e_o [2(1-\gamma_\perp^{-1})]^{1/2}}$$

wherein $\gamma_\perp$ is a relativistic energy factor of gyration, $m_0$ is a particle rest mass, c is the velocity of light, $\omega_c$ is a cyclotron frequency, $\tau_0$ is a residence time of particles in the electric field, and $e_0$ is an electric charge of a particle.

* * * * *

UNITED STATES PATENT AND TRADEMARK OFFICE

CERTIFICATE OF CORRECTION

PATENT NO. : 5,686,802
DATED : November 11, 1997
INVENTOR(S) : IKEGAMI

It is certified that error appears in the above-indentified patent and that said Letters Patent is hereby corrected as shown below:

Col. 4, line 36, "$\Delta_{107}$" should read --$\Delta\gamma$--.

Signed and Sealed this

Tenth Day of November 1998

Attest:

BRUCE LEHMAN

Attesting Officer

Commissioner of Patents and Trademarks